United States Patent [19]

Johns

[11] 4,365,792
[45] Dec. 28, 1982

[54] HYDRAULIC MOULD CLAMP

[75] Inventor: Roy W. Johns, Dromana, Australia

[73] Assignee: Johns Consolidated Limited, Clayton, Australia

[21] Appl. No.: 206,238

[22] Filed: Nov. 12, 1980

[30] Foreign Application Priority Data

Aug. 26, 1980 [AU] Australia .............................. PE5249

[51] Int. Cl.³ ............................................. B23Q 3/08
[52] U.S. Cl. ...................................... 269/24; 269/32; 269/93; 269/94; 269/224; 269/234
[58] Field of Search .................... 269/24, 32, 35, 234, 269/224, 91, 93, 94

[56] References Cited

U.S. PATENT DOCUMENTS 2,908,205 10/1959 Furman et al. ........................ 269/32
3,565,415 2/1971 Blatt ...................................... 269/32
4,027,867 6/1977 Pollington ............................ 269/234

Primary Examiner—Robert C. Watson
Attorney, Agent, or Firm—Ladas & Parry

[57] ABSTRACT

A clamp is disclosed which has a clamp block provided with a clamp surface for engaging a mould, die or the like. The clamp has a wedging member engageable with the clamp block and a rod receivable in a bore in the block. The rod is normally biased out of the bore so that a piston and cylinder assembly can be actuated so that the piston moves the rod and wedging member and also the clamp block to a position adjacent the mould, die or the like, whereupon continued movement of the piston forces the rod into the bore and the wedge member under the clamp block to pivot the clamp block into clamping engagement with the mould, die or the like.

13 Claims, 3 Drawing Figures

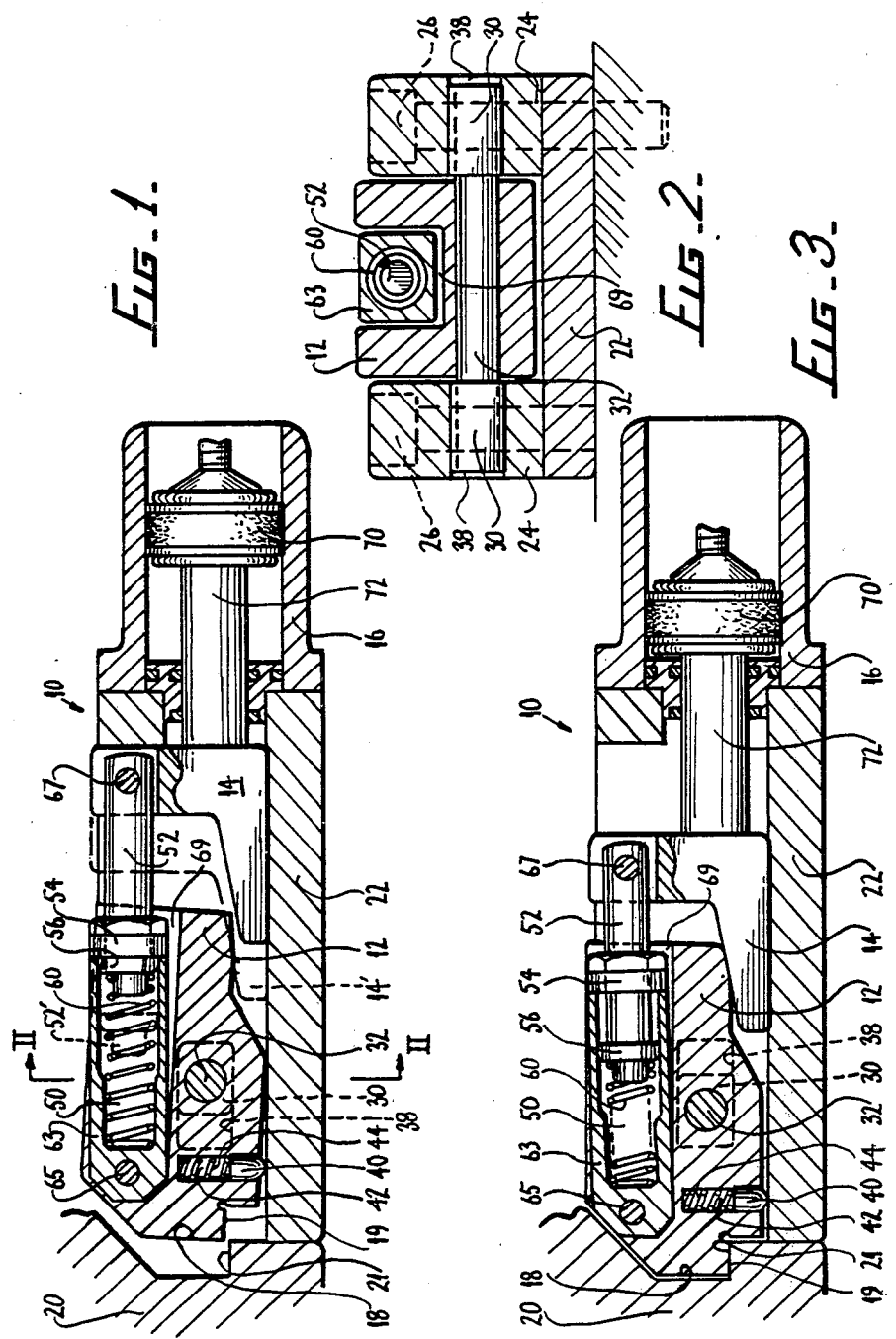

HYDRAULIC MOULD CLAMP

This invention relates to clamps and in particular to clamps for use with machine tools, die casting, metal pressing and compression moulding presses as well as plastics injection moulding machines.

In plastics injection moulding machines, for example, it is necessary to apply large forces to maintain mould or die sections or dies firmly against the machine platens during the parting of the moulds or dies in the injection moulding process. The dies used in the machines are often extremely heavy and expensive to produce and a malfunction of the clamping devices which hold the mould or die sections against the machine platens could result in a die slipping out of the machine. This could cause damage to the die and also may result in injury to persons operating the machine.

The present invention seeks to provide a clamp which has a minimum of parts to reduce the likelihood of malfunction and also to produce a clamp which will reliably apply a clamping force to a workpiece such as a mould or die.

The invention may be said to reside in a clamp, said clamp having a clamping member provided with a clamping surface for engaging a portion of a workpiece, said clamp having a locating means for locating the clamping member so that the clamping surface is adjacent the workpiece and means for pivoting the clamping member to clamp the clamping member against the workpiece.

Preferably the locating means comprises a hydraulic cylinder and piston means and said means for pivoting the clamping member comprises a wedging member, whereby a lost motion spring is disposed between the clamping member and the wedging member for maintaining a constant distance between the wedging member and clamping member until the clamping member ceases to move whereupon continued movement of the hydraulic cylinder and piston means causes said wedging member to move relative to the clamping member against the bias of said lost motion spring so that a wedging surface on the wedging member engages the clamp member to pivot the clamp member to clamp against the workpiece.

Preferably the clamp member ceases to move by either the clamping surface on the clamp member engaging the workpiece or a stop means on the clamp member abuts against a fixed member to limit movement of the clamp member.

Preferably the stop means is a pin and the fixed member is provided by ends of an elongated opening which receive at least one end of the pin, said elongated opening being provided on a clamp supporting member.

Preferably the clamp member includes a biasing means to bias the clamp member such that the clamping surface on the clamp member engages the desired portion of the workpiece.

A preferred embodiment of the invention will be described with reference to the accompanying drawings in which;

FIG. 1 is a cross-sectional view through a clamp embodying the invention;

FIG. 2 is a view along the line II—II of FIG. 1.

FIG. 3 is a view of the clamp of FIG. I in the clamping position.

With reference to FIGS. 1 and 2 a clamp 10 is shown which includes a clamp block 12, a wedging member 14 and a piston and cylinder assembly 16. The clamp block 12 has a clamping surface 18 which is shaped to match the configuration of that portion of a workpiece, for example a die plate 20, with which the clamping surface 18 engages. The clamp block 12 is located in a support structure comprised of a base member 22 and side supporting members 24. The side supporting members 24 are connected by suitable means such as bolts 26 to the base member 22. A pin 30 having two milled bearing flats 32 passes through the clamping block 12 and is journalled in the side supporting structures by the flats 32 so that the pin cannot move along its longitudinal axis. The side portions 24 are provided with elongated openings 38 one of which is schematically shown on FIG. 1 so that pin 30 is able to move in a direction transverse to its longitudinal axis as will be explained hereinafter. In a second embodiment (not shown) the side portions may be provided with elongated grooves or slots on their near sides which receive the flats 32 thus avoiding the need to completely drill through the entire side portion 24. In this case the flats 32 provide adequate bearing area to resist indentation of the slots or grooves during clamping. The clamp block 12 is also provided with a biasing member 40 which is provided in a bore 42 and biased downwardly by spring 44 to lift the front of the block 12 to ensure that the cut out portion 19 of clamping surface 18 moves over stepped portion 21 of die 20 so that the surface 18 properly engages the die 20.

A longitudinal bore 50 is provided in a thrust block 63 which is pivoted at 65 to the clamp block 12. The thrust block is provided in a groove in the clamp block which is best seen in FIG. 2. In the retracted position a space 69 is provided between the rear of the clamp block and the thrust block 63.

A rod 52 is pivoted at its rear end 67 to the top of wedging member 14 and is received in the bore 50 and held in place by a nut 54 through which the rod 52 can slide and a smaller nut 56 dimensioned to snuggly slide in bore 50. A lost motion spring 60 is pretensioned in the bore 50 and acts to maintain the rod in the bore as shown in FIG. 1 so that the spring 60 and rod 52 act as a fixed member to maintain a constant spacing between the clamp block 12 and the wedging member 14 to which rod 52 is also connected.

The wedging member 14 has a front wedging portion 62 and an upright portion 64 to which the rod 52 is connected. The wedging portion 62 has a portion which engages under the rear portion of the clamp block 12 as shown in FIG. 1. The rear of the clamp block is suitably dimensioned to receive the front of the wedging portion 62 of the wedging member 14.

A piston and cylinder assembly 16 is coupled to the rear of the device with a piston 70 having a rod 72 connected to the wedging member 14. The assembly 16 is preferably a hydraulic piston and cylinder assembly.

The operation of the device is as follows:

The device is set so that the front of the clamping surface 18 is about level with the outer most portion of the die 20. In this position the pin 30 is positioned such that the flats 32 are adjacent or abut the right hand end of the elongated opening 38 as seen in the drawing. The hydraulic piston and cylinder assembly 16 is actuated to drive the piston 70 forward which, via rod 72, forces the wedging member forward. Since the rod 52 and spring 60 act as a fixed member the wedging member 14 and clamp block 12 move forward in unison until the flats 32 of the pin 30 abut against the left hand end of opening 38 or the surface 18 abuts against the die 20. As the clamp block 12 moves forward the cut out portion 19 moves over stepped portion 21 with the aid of biasing member 40 so that the clamp block properly engages the die 20.

After the clamp block has stopped moving by either contacting the die 20 or the flats 32 of pin 30 abutting against the ends of the openings 38 continued movement of piston 70 will cause the wedging member to move relative to the clamp block 12 so that the wedging portion 62 slides under the clamp block 12 and the rod 52 moves into the bore 50 against the bias of spring 60 to the positions shown in dotted lines and designated 14' and 52' respectively. As the wedging member moves under the clamp block 12 the block pivots about the pivot 65 so that the space 69 of the rear of the block is taken up as seen in FIG. 3.

This relative movement of the wedging member 14 will also cause the clamp block to pivot about the pin 30 in the direction of arrow A as a thicker portion of the wedging portion 62 is driven under the clamp block 12. Accordingly the clamping surface 18 will be driven downwardly to clamp against the surface 21 of the die 20. The pivot at 67 between rod 52 wedging member 14 allows the front of the clamp block 12, thrust block 63 and rod 52 to pivot downwardly as the block pivots about the pin 30 into the clamping position shown in FIG. 3. At the same time the biasing member 40 is depressed into the bore 42 against the bias of spring 44. Accordingly the clamp block 12 is clampingly engaged against the die 20 to retain the die 20 in its required position.

The piston and cylinder assembly 16 may be driven by a separate pump unit (not shown) and also a single directional solenoid valve (not shown) may be energized to unclamp the clamp member from the die 20. In this regard when the solenoid valve is energized it acts to retract the piston 70 to in turn retract the clamp block from the die 20.

The tapered surface of the wedge portion 62 of the wedging member 14 is preferably provided with a taper of between 10° to 14°. With a taper in this range the wedging member 14 exhibits both a self-holding and a self-releasing function so that the wedging member is easily retained beneath the clamp block 12 in the clamping position whilst at the same time is easily retracted relative to the clamp block 12. A microswitch may also be disposed in the vicinity of rod 52 so that it is actuated by the movement of rod 52 when the rod 52 moves against the bias of spring 60. The microswitch may be used to actuate a plastics moulding machine, for example, so that the moulding process cannot commence until the clamp has properly clamped the die 20.

The preferred embodiment of the present invention has the advantage that it can apply a large clamping force to a workpiece reliably and endure the small number of parts is unlikely to malfunction. The wedging member and pivotal movement of the clamp block ensures that the clamp block properly engages the workpiece and applies a strong clamping force to the workpiece.

The preferred embodiment of the invention also provides a reliable mechanical or power operated clamp which will markedly reduce the time of physical man power required to unclamp moulds or dies when changing moulds in machines as production dictates. This is because the wedge members, piston, cylinder and clamp block firmly clamp the dies or moulds to a machine platen and merely require action of a solenoid valve to retract the clamp from the die or mould.

Since modifications within the spirit and scope of the invention may readily be effected by persons skilled within the art, it is to be understood that this application is not limited to the particular embodiment described by way of example hereinabove.

I claim:

1. A clamp comprising a clamping member provided with a clamping surface for engaging a portion of a workpiece, means for locating the clamping member so that the clamping surface is adjacent the workpiece, means for pivoting the clamping member to clamp the clamping member against the workpiece wherein said pivoting means comprises a wedging member which is engageable with the clamping member to pivot the clamping member into clamping engagement with the workpiece wherein said locating means moves said clamping member to a position adjacent the workpiece and said pivoting means is moveable relative to said clamping member when the clamping member is adjacent the workpiece said pivoting means forming part of the locating means so that the relative movement between the locating means and the clamping member causes the pivoting means to engage the clamping member and pivot the clamping member into engagement with the workpiece; and wherein said pivoting means further comprises a wedging member, and biasing means disposed between the clamping member and the wedging member for maintaining a constant distance between the wedging member and clamping member until the clamping member ceases to move whereupon continued movement of the locating means causes said wedging member to move relative to the clamping member against the bias of said biasing means so that a wedging surface on the wedging member engages the clamping member to pivot the clamping member to clamp against the workpiece.

2. A clamp according to claim 1, wherein said biasing means comprises a lost motion spring.

3. A clamp according to claim 1, wherein said locating means comprises a piston and cylinder assembly, the piston being coupled to the wedging member and the lost motion spring for moving the clamping member into engagement with the workpiece and for moving the wedging member relative to the clamping member.

4. A clamp according to claim 1, wherein said clamping member ceases to move by either the clamping surface on the clamping member engaging the workpiece or a stop means on the clamping member abuts against a fixed member to limit movement of the clamping member.

5. A clamp according to claim 4, wherein said stop means is a pin and the fixed member is provided by ends of an elongated opening which receives one end of the pin, said elongated opening being provided on a clamp supporting member.

6. A clamp according to claim 1, wherein said clamping member includes a biasing means to bias the clamping member such that the clamping surface on the clamping member engages the desired portion of the workpiece.

7. A clamp having a clamping block provided with a clamping surface for engaging a workpiece, said clamp having a locating means, said locating means being coupled to a wedging member and to a rod received in a bore in said clamping block, said rod being biased by biasing means against movement into said bore, and said clamping block having a surface engageable by said wedging member, such that said locating means moves said rod to in turn move said clamping block and wedging member until said clamping block stops adjacent said workpiece and whereupon continued movement of said locating means causes said rod to move into said bore against the bias of said biasing means so that the wedging member moves relative to the clamping block to pivot the clamping block so that the clamping block clampingly engages the workpiece.

8. A clamp according to claim 7 wherein, said clamping block stops adjacent said workpiece by either engaging said workpiece or a stop means on the clamping block abuts against a fixed member to limit movement of the clamping block.

9. A clamp according to claim 7 or claim 8, wherein said wedging member engages the rear of the clamping block and when the wedging member moves relative to the clamping block the wedging member is forced under the clamping block to pivot the clamping block.

10. A clamp according to claim 7 or claim 8, wherein the wedging member has a wedging surface provided with a taper on between 10° and 14°.

11. A clamp according to claim 7 or claim 8, wherein said locating means comprises a piston and cylinder assembly.

12. A clamp according to claim 7 or claim 8, wherein said clamp is provided with a pair of side members and a base, the clamping block being movable on said base and said clamping block having a cut out portion at its rear, said wedging member also being moveable on said base and being received in said cut out portion, said side portions having recesses which receive a pin means provided on said clamping block to limit movement of the clamping block by the pin means engaging ends of the recess in the side portions.

13. A clamp according to claim 7, wherein said clamping block has a thrust block which is pivoted to the clamping block, said bore being provided in the thrust block, said thrust block being spaced from said clamping block so that as the clamping block is pivoted the clamping block pivots relative to the thrust block to take up said space and said rod being pivotally coupled to said wedging member so that the clamping block, thrust block and rod can pivot about the pivotal couple when the clamping block is pivoted into clamping engagement with the workpiece.

* * * * *